United States Patent
Heck et al.

(10) Patent No.: US 8,162,406 B2
(45) Date of Patent: Apr. 24, 2012

(54) MULTI-PIECE VEHICLE WHEEL COVER RETENTION SYSTEM AND METHOD FOR PRODUCING SAME

(75) Inventors: Thomas E. Heck, Monroe, MI (US); Patrick McCorry, Plymouth, MI (US); Todd Duffield, Westland, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 101 days.

(21) Appl. No.: 12/651,523

(22) Filed: Jan. 4, 2010

(65) Prior Publication Data

US 2011/0163593 A1 Jul. 7, 2011

(51) Int. Cl.
*B60B 7/08* (2006.01)
*B60B 7/04* (2006.01)

(52) U.S. Cl. ............ 301/37.43; 301/37.11; 301/37.102

(58) Field of Classification Search ............ 301/37.101, 301/37.102, 37.11, 37.43, 37.27, 37.106, 301/37.42

See application file for complete search history.

(56) References Cited

U.S. PATENT DOCUMENTS

| | | | |
|---|---|---|---|
| 3,669,501 A | 6/1972 | Derleth | |
| 3,724,905 A * | 4/1973 | Kachler | 301/37.42 |
| 3,726,566 A | 4/1973 | Beith | |
| 5,188,428 A * | 2/1993 | Carter, III | 301/37.11 |
| 5,368,370 A | 11/1994 | Beam | |
| 5,458,401 A * | 10/1995 | Baccman | 301/37.43 |
| 5,597,213 A | 1/1997 | Chase | |
| 5,630,654 A * | 5/1997 | Chase | 301/37.43 |
| 6,152,538 A | 11/2000 | Ferriss et al. | |
| 6,346,159 B1 | 2/2002 | Chase et al. | |
| 6,406,100 B1 | 6/2002 | Kinstler | |
| 6,460,938 B1 * | 10/2002 | Baumgarten | 301/37.11 |
| 6,502,308 B1 | 1/2003 | Carfora et al. | |
| 6,609,763 B1 | 8/2003 | Kinstler et al. | |
| 6,779,852 B2 | 8/2004 | Van Houten et al. | |
| 6,991,299 B2 | 1/2006 | Hauler | |
| 7,025,426 B2 * | 4/2006 | Hogan | 301/37.11 |
| 7,066,557 B2 * | 6/2006 | Chase | 301/37.11 |
| 8,052,223 B2 * | 11/2011 | McCorry et al. | 301/37.43 |
| 2006/0261665 A1 * | 11/2006 | Gomora-Camargo et al. | 301/37.43 |
| 2010/0283312 A1 * | 11/2010 | Bruce | 301/37.106 |

* cited by examiner

*Primary Examiner* — Jason Bellinger
(74) *Attorney, Agent, or Firm* — McMillan, Sobanski & Todd, LLC

(57) ABSTRACT

A method for producing a multi-piece vehicle wheel retention system comprises the steps of: (a) providing a wheel having a wheel disc defining and axis and an outboard facing wheel surface; (b) providing a first outer wheel cover formed from a metal material, the first outer wheel cover covering at least a portion of the an outboard tire bead seat retaining flange of the wheel disc; (c) providing a second inner wheel cover formed from a plastic material, the second inner wheel cover covering at least a substantial portion of the outboard facing wheel surface of the wheel disc; (d) providing an insert formed from a foam material and which generally corresponds to at least the shape of a space which formed between the outboard facing wheel surface and the inboard surface of the second wheel cover; (e) securing the first and second inner wheel covers together by at least an interference fit therewith; and (f) permanently securing the assembled wheel covers of step (e), the insert and the wheel to one another by adhesive to produce the multi-piece vehicle wheel retention system.

14 Claims, 13 Drawing Sheets

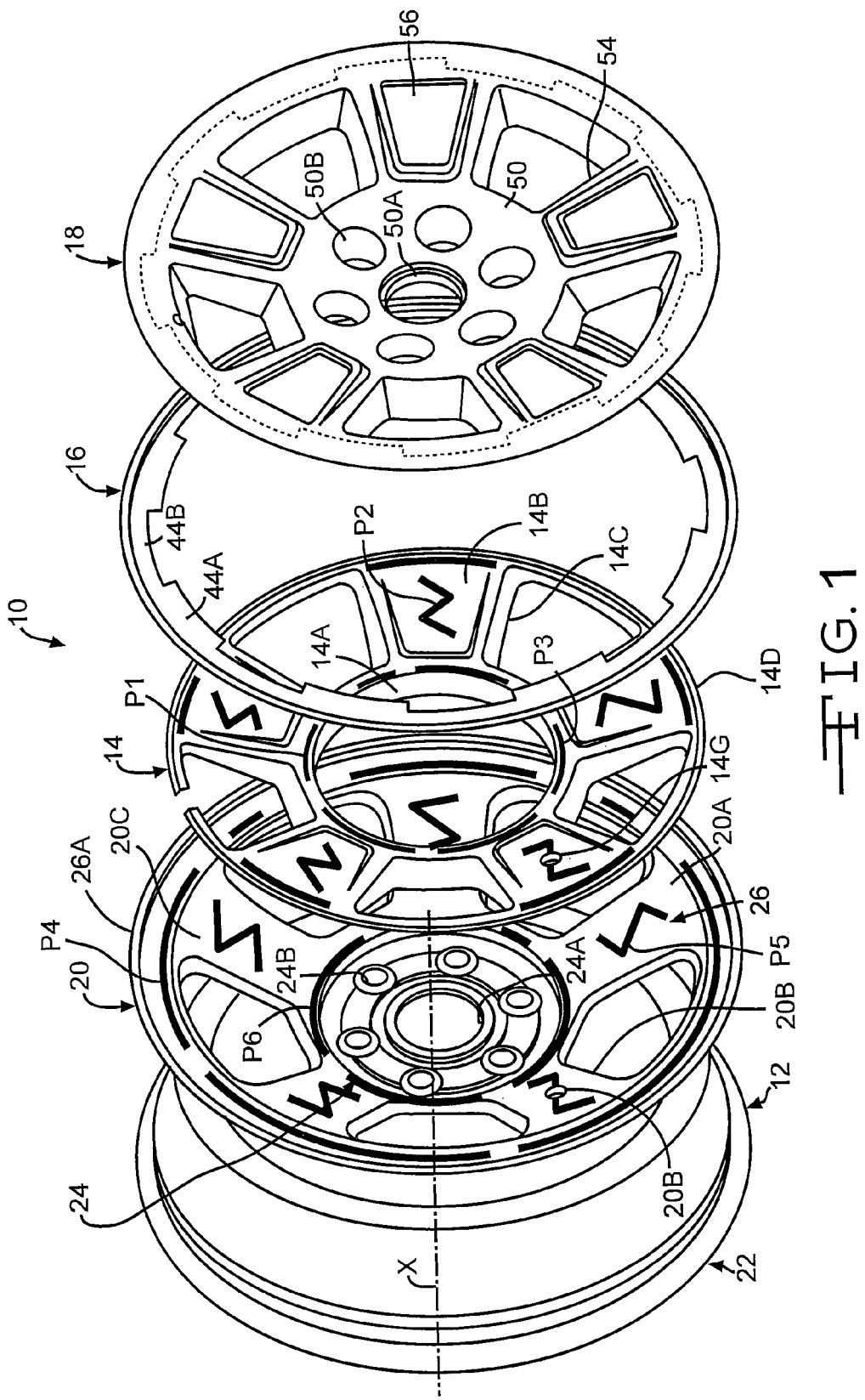

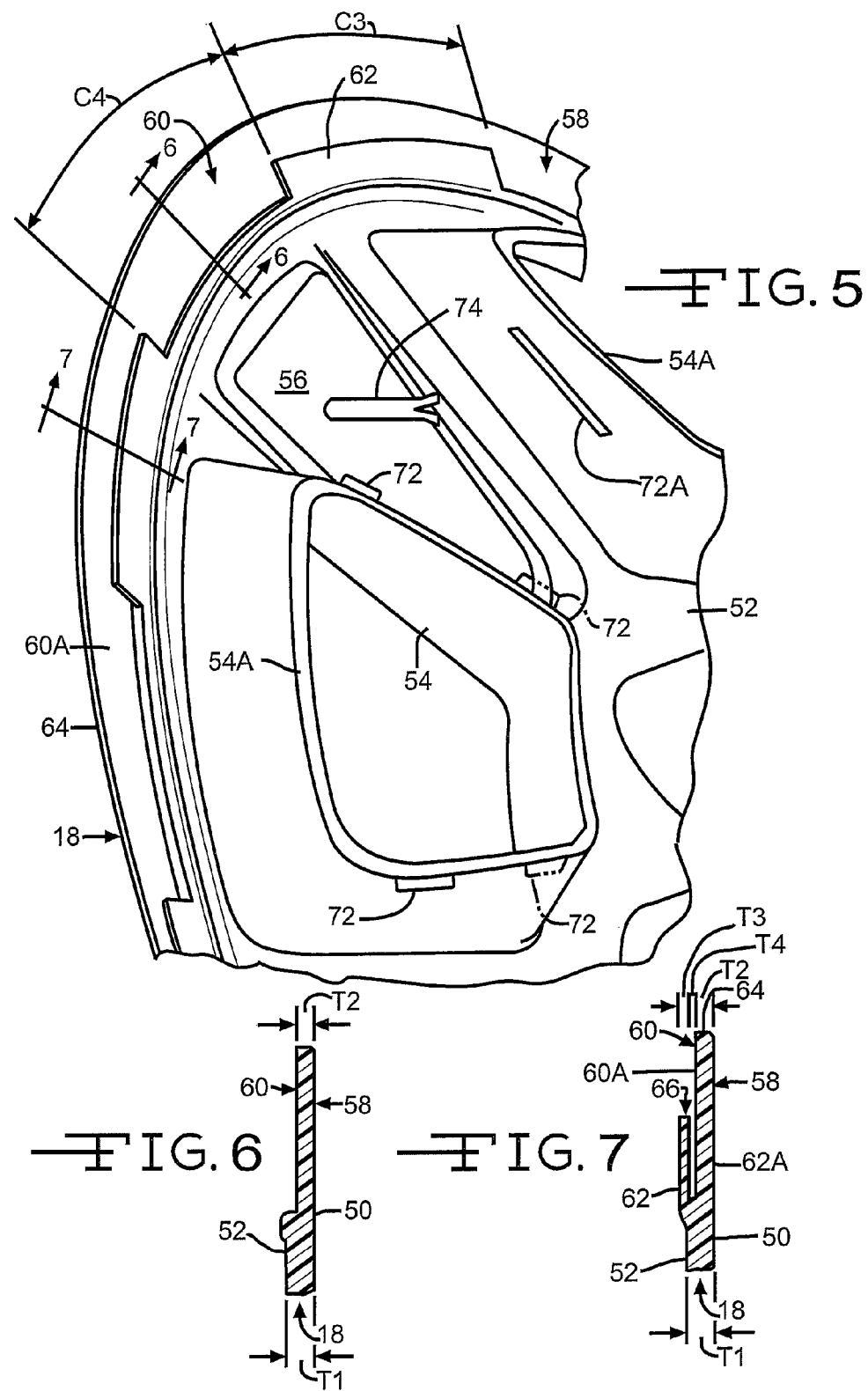

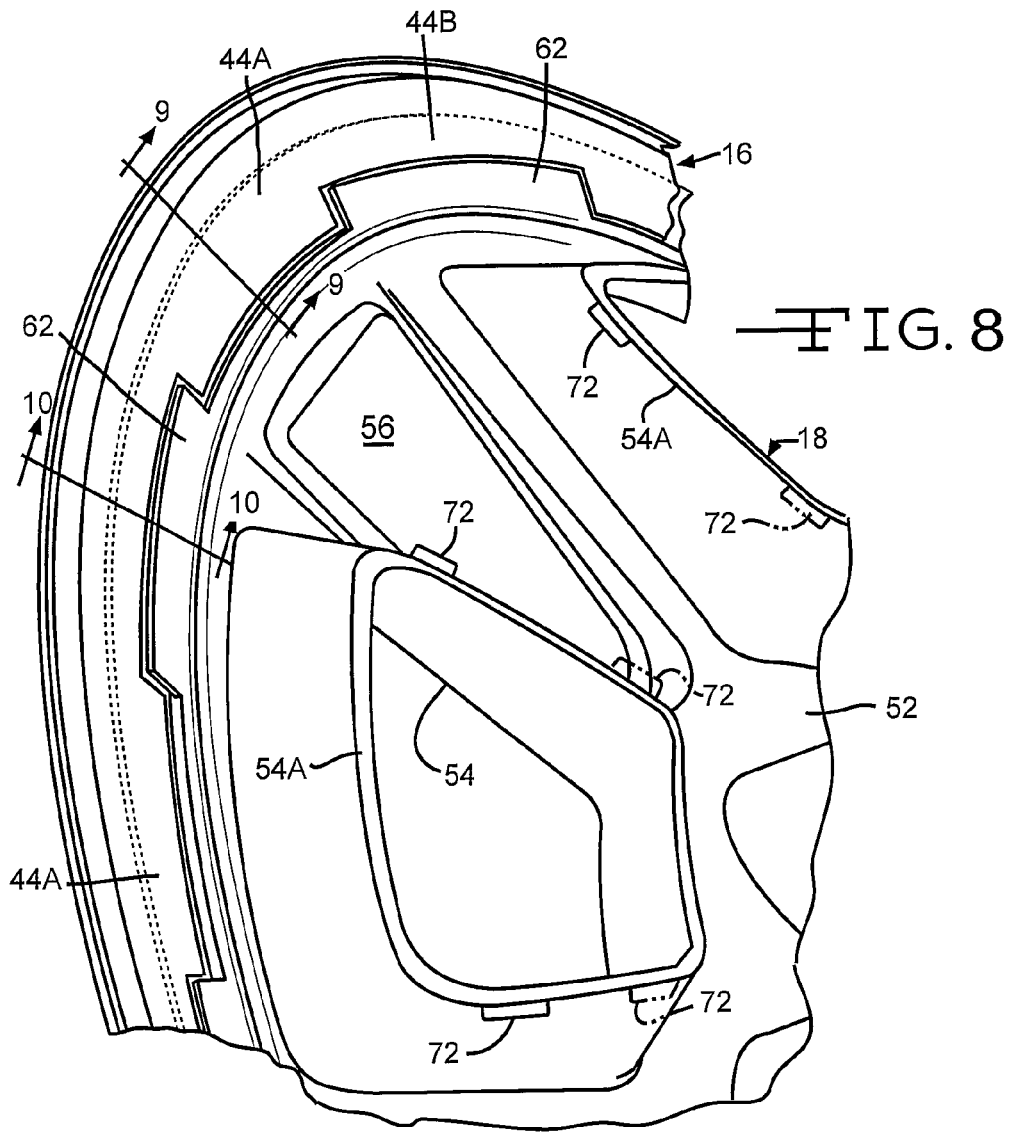
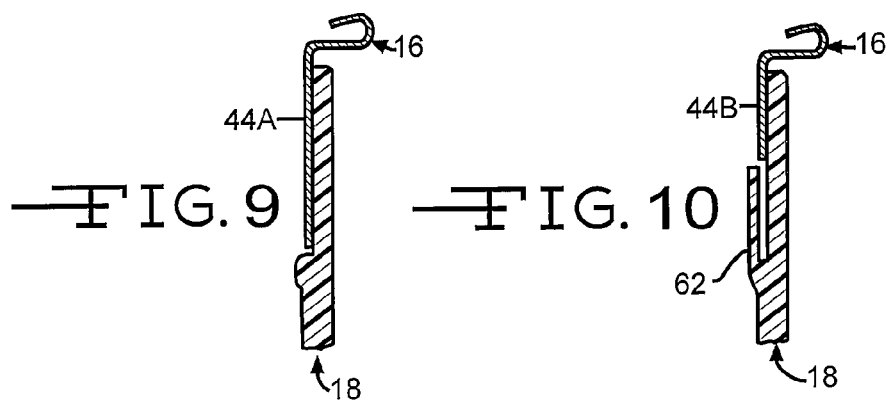

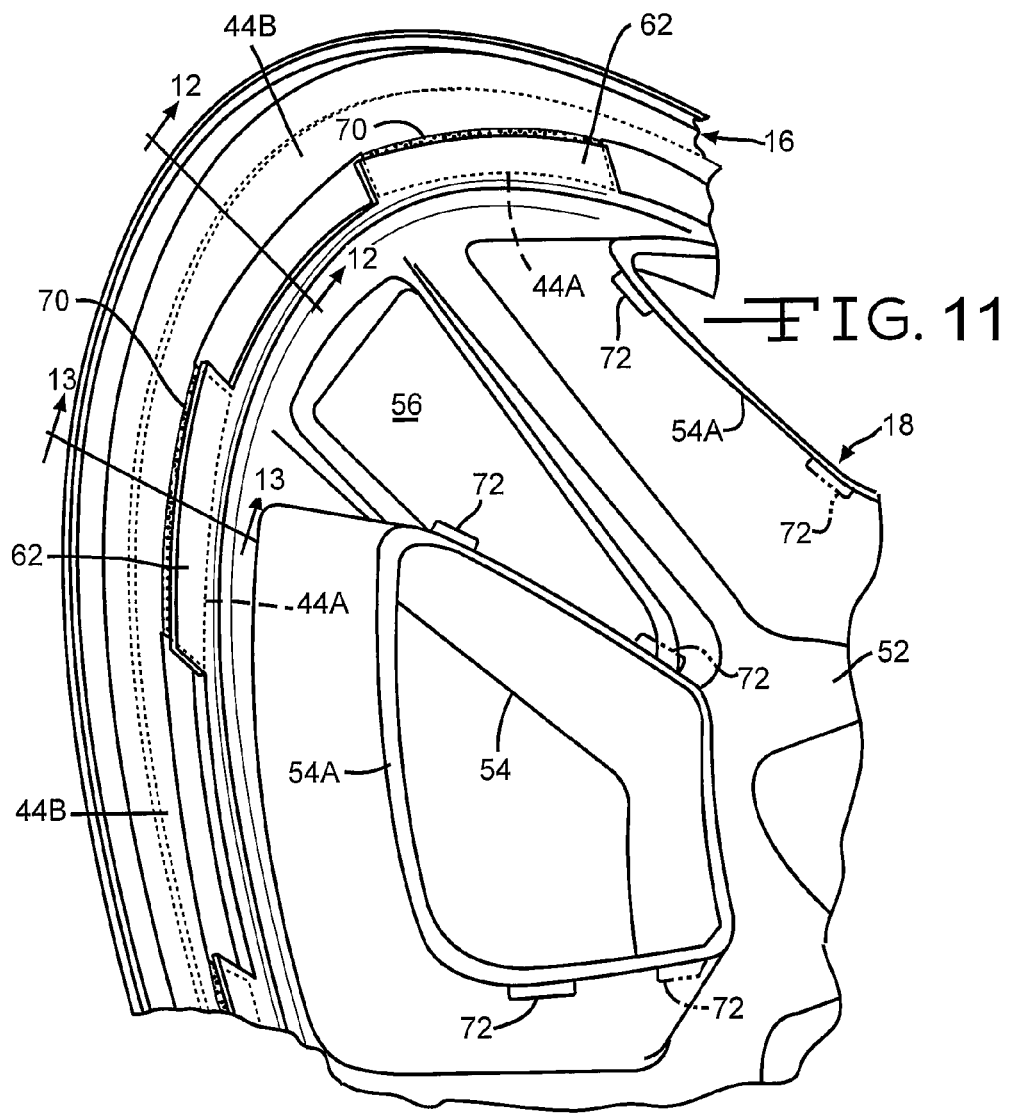
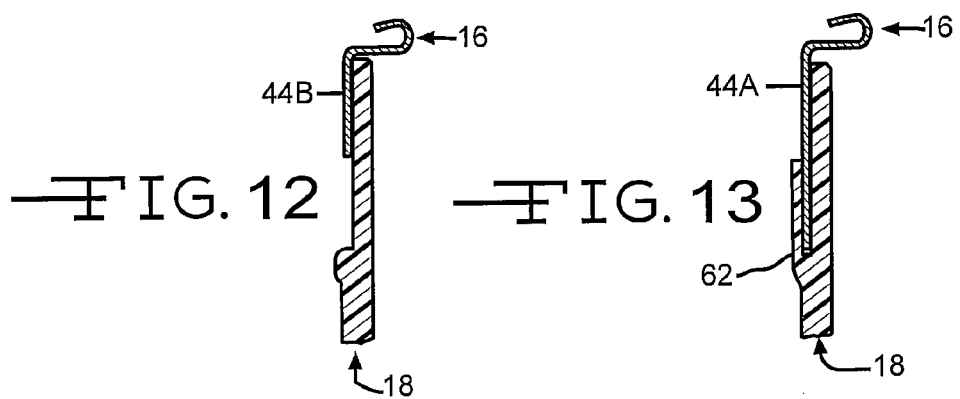

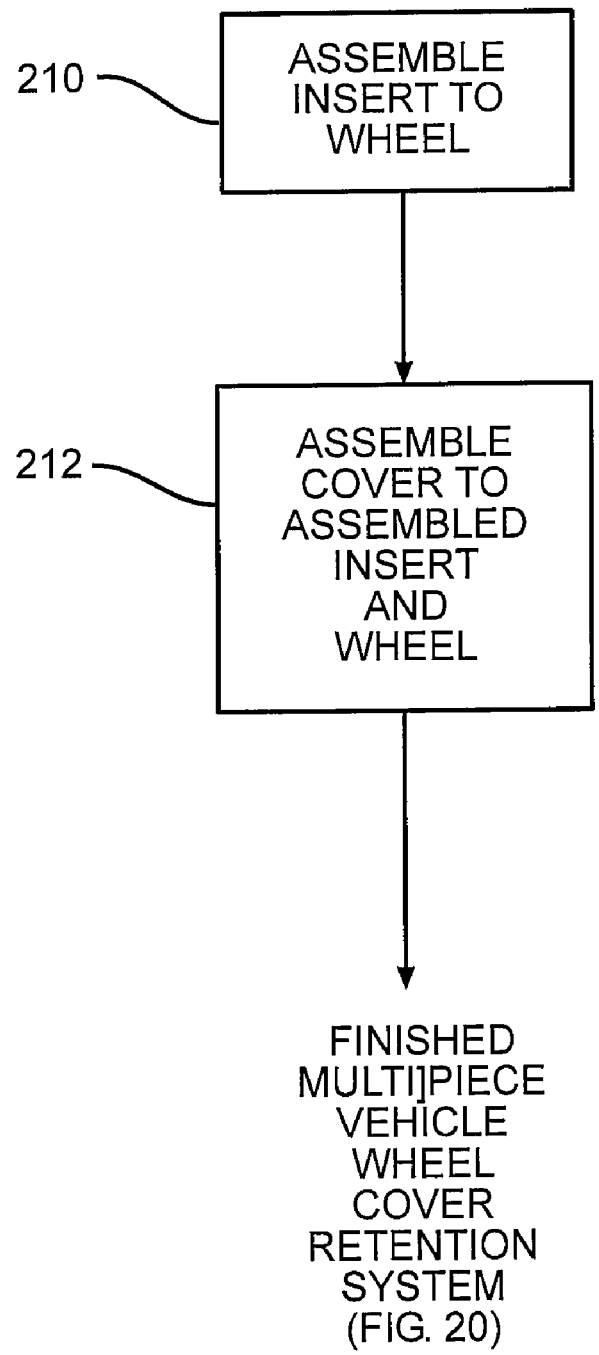

MULTI-PIECE VEHICLE WHEEL COVER RETENTION SYSTEM AND METHOD FOR PRODUCING SAME

CROSS-REFERENCE TO RELATED APPLICATIONS

The present application is related to U.S. application Ser. No. 12/499,124, filed Jul. 8, 2009, now U.S. Pat. No. 8,052,223.

BACKGROUND OF THE INVENTION

This invention relates in general to vehicle wheels and, in particular, to an improved multi-piece vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

A yet further example of a vehicle wheel having a permanently secured wheel cover is disclosed in U.S. Pat. No. 5,368,370 to Beam. In the Beam patent, a chrome-plated stainless steel wheel cover includes an outer peripheral edge which is forced into engagement behind a catch formed in the outer rim flange to hold the wheel cover in place while an adhesive cures.

Still yet a further example, of a vehicle wheel having a permanently secured wheel cover is disclosed in U.S. Pat. No. 3,726,566 to Beith. In the Beith patent, a steel, aluminum, or plastic wheel cover is secured to a wheel, and includes a terminal flange having a lip which is formed to grip the edge of the outboard tire bead seat retaining flange of the wheel.

Yet a further example of a vehicle wheel having a permanently secured wheel cover is disclosed in U.S. Pat. No. 6,152,538 to Ferriss et al. In the Ferriss et al. patent, a multi-piece wheel cover assembly is provided which is secured to the associated vehicle wheel.

Still further examples of vehicle wheels having permanently secured wheel covers are disclosed in U.S. Pat. No. 6,406,100 to Kinstler and U.S. Pat. No. 6,609,763 to Kinstler et al. In both of these two patents, a multi-piece wheel cover assembly is provided which is secured to the associated vehicle wheel.

SUMMARY OF THE INVENTION

This invention relates to a method for producing a multi-piece vehicle wheel retention system comprising the steps of: (a) providing a wheel having a wheel disc defining an axis and an outboard facing wheel surface and including an outboard tire bead seat retaining flange; (b) providing a first outer wheel cover formed from a metal material, the first outer wheel cover covering at least a portion of the outboard tire bead seat retaining flange of the wheel disc; (c) providing a second inner wheel cover formed from a plastic material, the second inner wheel cover covering at least a substantial portion of the outboard facing wheel surface of the wheel disc, the second wheel cover including an outboard surface and an inboard surface; (d) providing an insert formed from a foam material and which generally corresponds to at least the shape of a space which formed between the outboard facing wheel surface of the wheel and the inboard surface of the second wheel cover, the insert including an outboard surface and an inboard surface; (e) securing the first outer wheel cover and the second inner wheel cover together by at least an interference fit therewith; and (f) permanently securing the assembled wheel covers of step (e), the insert and the wheel to one another by adhesive to produce the multi-piece vehicle wheel retention system.

In another embodiment of the invention, a multi-piece wheel cover assembly is disclosed which comprises: a wheel having a wheel disc defining an axis and an outboard facing wheel surface and including an outboard tire bead seat retaining flange; a first outer wheel cover formed from a metal material, the first outer wheel cover covering only the entire portion of the outboard tire bead seat retaining flange of the wheel disc; a second inner wheel cover formed from a plastic material, the second inner wheel cover covering at least a substantial portion of the outboard facing wheel surface of the wheel disc, the second wheel cover including an outboard surface and an inboard surface, the first outer wheel cover and the second inner wheel cover together by at least an interference fit therewith; and an insert formed from a foam material and which generally corresponds to at least the shape of a space which formed between the outboard facing wheel surface of the wheel and the inboard surface of the second wheel cover, the insert including an outboard surface and an inboard surface; wherein the first outer wheel cover, the second inner wheel cover, the insert and the wheel are permanently secured to one another by adhesive to produce the multi-piece vehicle wheel retention system.

In yet another embodiment, a method for producing a multi-piece vehicle wheel retention system is disclosed comprising the steps of: (a) providing a wheel having a wheel disc defining an axis and an outboard facing wheel surface and including an outboard tire bead seat retaining flange; (b) providing a wheel cover formed from a metal material, the wheel cover covering at least a substantial portion of the outboard facing wheel surface of the wheel disc, the wheel cover including an outboard surface and an inboard surface; (c) providing an insert formed from a foam material and which generally corresponds to at least the shape of a space which formed between the outboard facing wheel surface of the wheel and the inboard surface of the wheel cover, the insert including an outboard surface and an inboard surface; (d) permanently securing the insert and the wheel to one another by adhesive; and (e) permanently securing the wheel cover to the insert by adhesive to produce the multi-piece vehicle wheel retention system.

In yet still a further embodiment a multi-piece vehicle wheel retention system is disclosed which comprises: a wheel having a wheel disc defining an axis and an outboard facing wheel surface and including an outboard tire bead seat retaining flange; a wheel cover formed from a metal material, the wheel cover covering at least a substantial portion of the outboard facing wheel surface of the wheel disc, the wheel cover including an outboard surface and an inboard surface; and an insert formed from a foam material and which generally corresponds to at least the shape of a space which formed between the outboard facing wheel surface of the wheel and the inboard surface of the wheel cover, the insert including an outboard surface and an inboard surface; wherein the wheel cover, the insert and the wheel are permanently secured to one another by adhesive to produce the multi-piece vehicle wheel retention system; and wherein the wheel cover is provided with at least one surface feature formed thereon which retains the wheel cover to at least one of the insert and the wheel while the adhesive therebetween cures.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an exploded perspective view of a first embodiment of a multi-piece vehicle wheel cover retention system.

FIG. 5 is a view showing the initial assembly of the associated wheel cover of the multi-piece vehicle wheel cover retention system illustrated in FIG. 1.

FIG. 6 is a sectional view taken along line 6-6 of FIG. 5.

FIG. 7 is a sectional view taken along line 7-7 of FIG. 5.

FIG. 8 is a view showing the next step of the assembly of the associated vehicle wheel cover of the multi-piece vehicle wheel cover retention system illustrated in FIG. 1

FIG. 9 is a sectional view taken along line 9-9 of FIG. 8.

FIG. 10 is a sectional view taken along line 10-10 of FIG. 8.

FIG. 11 is a view showing the final step of the assembly of the associated vehicle wheel cover of the multi-piece vehicle wheel cover retention system illustrated in FIG. 1

FIG. 12 is a sectional view taken along line 12-12 of FIG. 11.

FIG. 13 is a sectional view taken along line 13-13 of FIG. 11.

FIG. 21 is a flow chart illustrating a third embodiment of a sequence of steps for producing an embodiment of the multi-piece vehicle wheel cover retention system of the present invention.

DETAILED DESCRIPTION OF THE INVENTION

Figure 3:
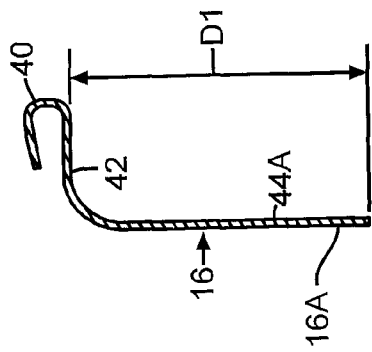
FIG. 3 is a sectional view taken along line 3-3 of FIG. 2.
Figure 4:
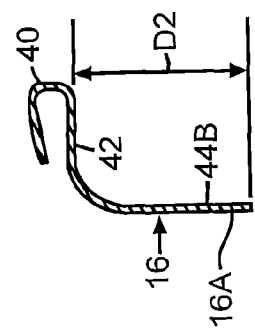
FIG. 4 is a sectional view taken along line 4-4 of FIG. 2.

Referring now to FIG. 1, there is illustrated an exploded perspective view of a first embodiment of a multi-piece vehicle wheel cover retention system, indicated generally at 10, according to the present invention. Although the present invention is illustrated and described in conjunction with the particular vehicle wheel constructions disclosed herein, it will be appreciated that the invention can be used in conjunction with other types of vehicle wheel constructions, if so desired. For example, as shown herein or with modifications thereto, the present invention may be used in connection with associated vehicle wheels formed from any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "fabricated well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euroflange type of wheel such as shown in U.S. Pat. No. 5,564,792 to Archibald, the disclosures of all of these patents incorporated by reference in entirety herein.

As shown therein, the first embodiment of a multi-piece vehicle wheel cover retention system 10 includes a vehicle wheel 12, an insert 14, and a multi-piece wheel cover including a first "outer" wheel cover 16 and a second "inner" wheel cover 18. In the illustrated embodiment, the vehicle wheel 12 is a fabricated full face vehicle wheel (best shown in FIG. 14), and includes an outer full face wheel disc 20 and an inner partial wheel rim 22 which are joined together by one or more welds W.

The wheel disc 20 can be formed from any suitable material, such as for example, steel, aluminum, alloys thereof, magnesium, or titanium. In the illustrated embodiment, the wheel disc 20 defiles a wheel axis X and includes a generally centrally located inner wheel mounting surface or portion 24, an outer annular portion 26, and defines an outer surface or outboard face 20A of the vehicle wheel 10. The inner mounting surface 24 of the wheel disc 20 is provided with a center hub hole 24A and a plurality of lug bolt mounting holes 24B spaced circumferentially around the center hub hole 24A. The lug bolt receiving holes 24B are adapted to receive lug bolts (not shown) and nuts (not shown) for securing the vehicle wheel 10 on an axle (not shown) of a vehicle. The outer annular portion 26 includes an outer end 26A which defines an outboard tire bead seat retaining flange of the vehicle wheel 10. Also, as shown in this embodiment, the wheel disc 20 further includes a plurality of windows or openings 20B formed therein between each pair of spokes 20C. Alternatively, as discussed above, the construction, material and/or make-up of the wheel disc 20 may be other than illustrated if so desired.

The wheel rim 22 can be formed from any suitable material, such as for example, steel, aluminum, alloys thereof, magnesium, or titankun. In the illustrated embodiment, the wheel rim 22 includes an inboard tire bead seat retaining flange 32, an inboard tire bead seat 34, a well 36, and an outboard tire bead seat 38. Alternatively, as discussed above, the construction, material and/or make-up of the wheel rim 22 may be other than illustrated if so desired.

Figure 14:
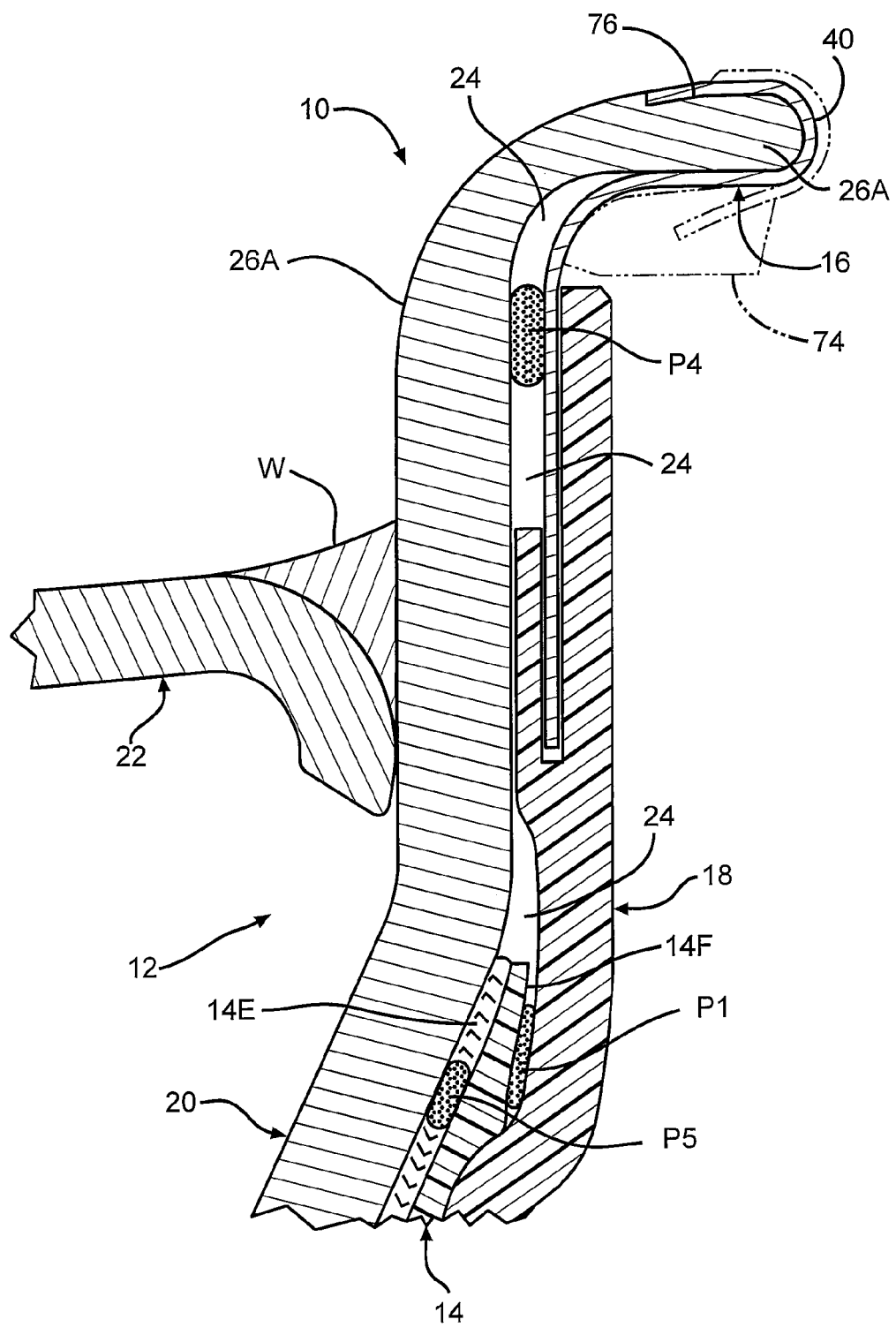
FIG. 14 of a sectional view through of a portion of the assembled multi-piece vehicle wheel cover retention system according to the first embodiment.

In the illustrated embodiment, the insert 14 is preferably a preformed insert formed from a suitable material, such as for example, a suitable foam material. Alternatively, the insert 14 can be formed from other suitable materials and/or can be formed in-situ directly onto the assembled wheel covers 16 and 18 if so desired. Also, depending upon the particular shape of the vehicle wheel 12 and the assembled wheel covers 16 and 18, the insert 14 may not be necessary. However, as shown in FIG. 14, in the illustrated embodiment due to the particular construction of the vehicle wheel 12 and the covers 16 and 18, the insert 14 is preferably used to fill a space which is formed between the outboard face 20A of the wheel 12 and associated inner surface of at least the second wheel cover 18 to result in a "solid" sound rather than a "hollow" sound if the first and second covers 16 and 18 are "tapped" by a person.

In the illustrated embodiment, the insert 14 preferably generally corresponds to the shape of the space which is formed between the outboard face 20A of the wheel 12 and at least a portion of an associated inboard face or surface 52 of at least the wheel cover 18. Alternatively, the insert 14 could also fill at least part of a space which is formed between the outboard face 20A of the wheel and at least a portion of an associated inboard face or surface 16A of at least a portion of the wheel cover 16 is do desired. In the illustrated embodiment, the insert 14 includes a central opening 14A, spokes 14B, windows 14C, and an outer annular portion 14D.

In the illustrated embodiment, the first wheel cover 16 is preferably a preformed wheel cover formed from a metal material. More preferably, the first wheel cover 16 is formed from stainless steel having a thickness of approximately 0.020 inch, and is painted, chrome-plated, or brightly polished. Alternatively, the first wheel cover 16 can be formed from other materials if desired. For example, the first wheel cover 16 can be formed from other metals and non-metals, such as for example, aluminum and plastic. Preferably, an outboard surface of the first wheel cover 16 is finished to match an outboard surface of the second wheel cover 18; however, the first wheel cover 16 and the second wheel cover 18 can have different finishes if desired.

Figure 2:
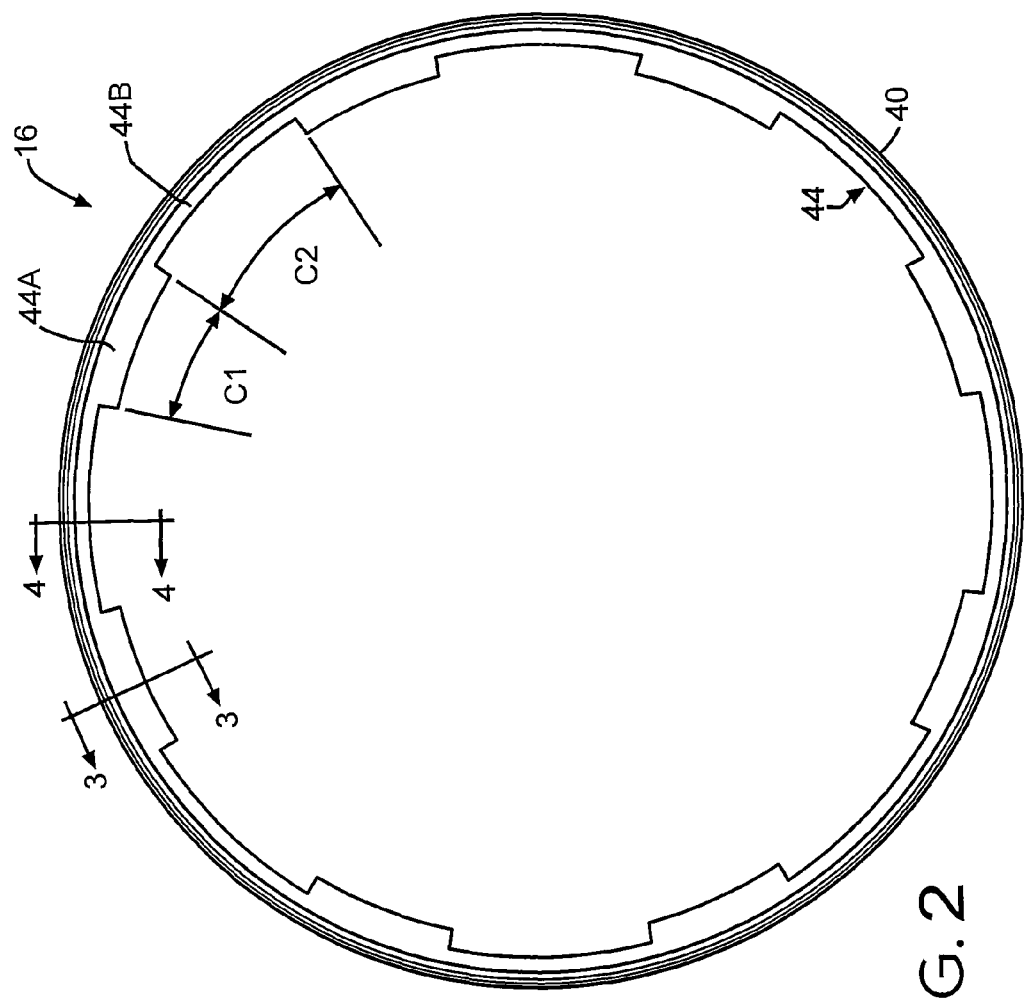
FIG. 2 is a plan view of a portion of the vehicle wheel cover retention system illustrated in FIG. 1, showing a portion of the associated multi-piece vehicle wheel cover.

As shown in FIGS. 2-4, the first wheel cover 16 is preferably formed from a single piece of material by a stamping operation to produce the unique annular shape best shown in FIG. 2. As shown therein, the first wheel cover 16 includes a generally U-shaped or inverted outer end 40, a first leg 42, and a second leg, indicated generally at 44. The first leg 42 extends generally parallel with respect to the axis X and the second leg 44 extends generally perpendicular to the first leg 42.

As will be discussed below, in the illustrated embodiment, the second leg 44 of the first wheel cover 16 is segmented and includes a plurality of first leg members 44A and a plurality of second leg members 44B. The first leg members 44A extend a first radial distance D1 and the second leg members 44B extend a second radial distance D2 which is less than the first radial distance D1. In the illustrated embodiment, the first leg members 44A extend a first angular extent C1 and the second leg members 44B extend a second angular extent C2 which is greater than the first angular extent C1. Alternatively, the first wheel cover 16 can be formed from other suitable methods, such as for example, by taking a strip or band of material having a desired shape and forming the strip into an annular hoop and welding the ends together. Also, the outer end 40 of the first wheel cover 16 does not have to be preformed prior to assembly onto the associated vehicle wheel 10 but may be formed after assembly onto the vehicle wheel 10. Suitable methods for forming the outer end 40 after assembly are disclosed in U.S. Pat. No. 6,406,100 to Kinstler, U.S. Pat. No. 6,502,308 to Carfora et al., and U.S. Pat. No. 6,609,763 to Kinstler et al., the disclosures of each of these patents incorporated by reference herein in entirety. Alternatively, the construction of the first wheel cover 16 may be other than illustrated if so desired.

In the illustrated embodiment the second wheel cover 18 is preferably formed from a plastic material and is painted or chrome-plated. The second wheel cover 18 can be prefabricated to generally match the particular configuration of the outboard facing surface of the associated vehicle wheel or, as illustrated, can have portions which are spaced apart from the outboard facing surface 20A of the wheel to provide for styling. Alternatively, the second wheel cover 18 can be formed from other materials, such as for example, aluminum or stainless steel, if so desired.

As shown in this embodiment, the second wheel cover 18 includes an outboard face or surface 50 and the inboard face or surface 52, as shown in FIGS. 5-8 and 11. The second wheel cover 18 is provided with a center hub hole 50A, and a plurality of lug bolt mounting holes 50B spaced circumferentially around the center hub hole 50A. Also, as shown in this embodiment, the second wheel cover 18 further includes a plurality of wheel cover decorative windows 54 formed therein between each pair of "solid" spokes 56.

As best shown in FIGS. 5-8 and 11, an outer peripheral edge, indicated generally at 58, of the inboard surface 52 of the second wheel cover 18 includes a unique configuration having a surface feature provided on the inboard surface 52 thereof for receiving and securing the first wheel cover 16 therewith. In particular, in the illustrated embodiment, the outer peripheral edge 58 of the inboard surface 52 is segmented and includes a generally non-raised or flat continuous surface, indicated generally at 60, and a plurality of spaced apart raised arcuate or circumferentially extending fingers 62 spaced circumferentially away from the surface 60. In the illustrated embodiment, the forgers 62 extend a third angular extent C3 and as shown in FIG. 7, extend outwardly toward but stop short of an outermost circumferential side edge 64 of the second wheel cover 18. As a result of this, a circumferential channel or groove 66 is formed in the outer peripheral edge 58 of the second wheel cover 18 between the adjacent opposed surfaces 60A and 62A of the flat portion 60 and the fingers 62, respectively. The flat portion 60 of the outer peripheral edge 58 which extends between each of the pair of fingers 62 extends a fourth angular extent C4. In the illustrated embodiment, the angular extent C1 of the first wheel cover 16 has to be at least slightly less than the angular extent C4 of the second wheel cover 18, and the angular extent C2 of the first wheel cover 16 has to be at least slightly greater than the angular extent C3 of the second wheel cover 18 for a purpose to be explained below.

As can be seen in the illustrated embodiment, in FIGS. 6 and 7 the second wheel cover 18 defines a generally uniform cover thickness T1 adjacent inwardly relative to the outer peripheral edge 58 thereof. As shown in FIG. 6, the flat portion 60 of the outer peripheral edge 58 define a thickness T2 which is less than the thickness T1. As shown in FIG. 7, the finger 62 defines a thickness T3 and the channel 66 defines a thickness T4. As can be seen in the illustrated embodiment, the combined thicknesses T2, T3 and T4 is greater than the thickness T1. Alternatively, the construction of the second wheel cover 18 may be other than illustrated if so desired.

Figure 18:
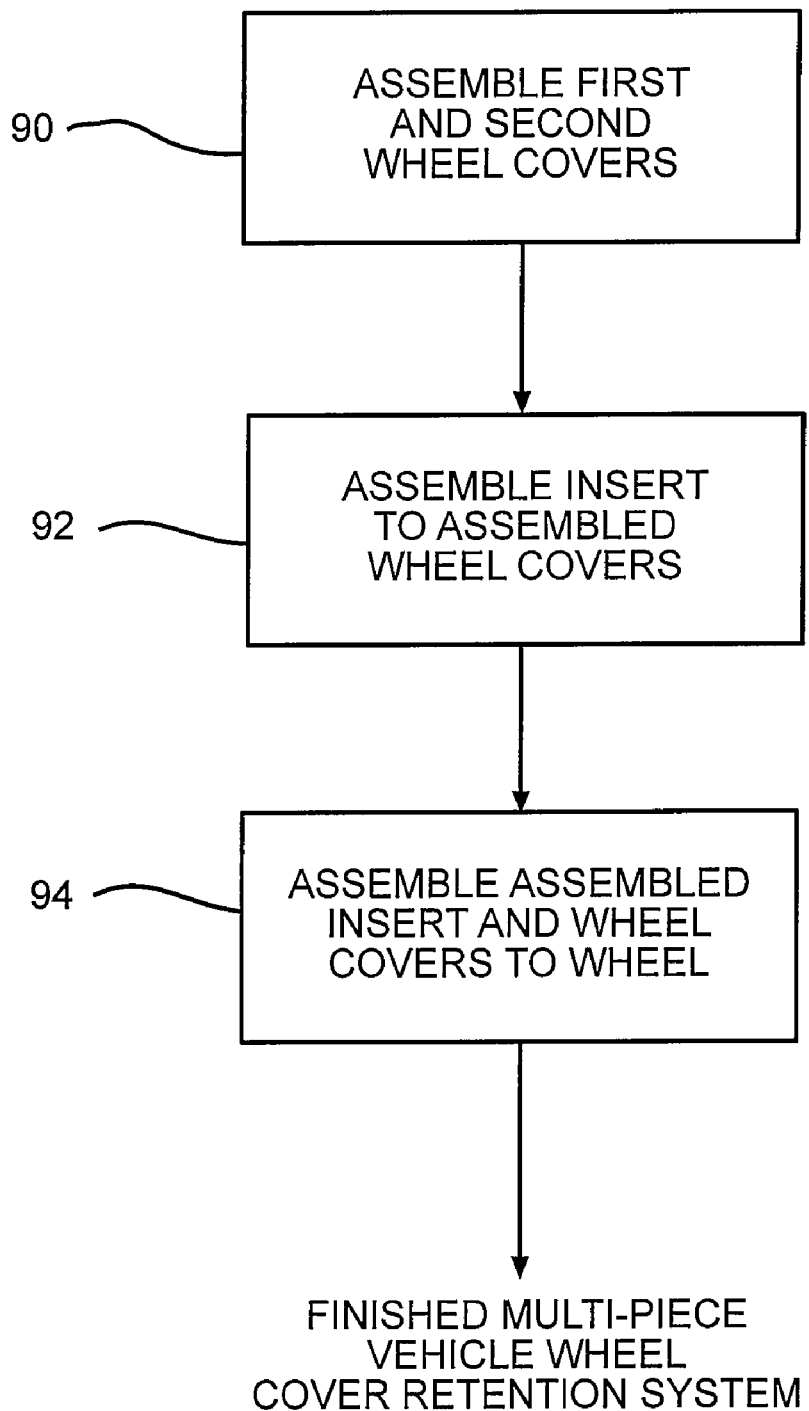
FIG. 18 is a flow chart illustrating a first embodiment of a sequence of steps for producing an embodiment of the multi-piece vehicle wheel cover retention system of the present invention.

Referring now to FIG. 18, there is illustrated a block diagram showing an embodiment of a sequence of steps of assembly for producing the multi-piece vehicle wheel cover retention system 10 of the present invention. Preferably, as shown therein, in a first step 90 of the illustrated embodiment of the assembly process, the first wheel cover 16 is secured to the second wheel cover 18. To accomplish this in the illustrated embodiment, as shown in FIGS. 8-10 the first wheel cover 16 is initially disposed adjacent the second wheel cover 18 with the second leg 44 of the first wheel cover 16 adjacent the flat surface 60 of the second wheel cover 18. More particularly, a respective one of each of the first leg members 44A of the first wheel cover 16 is disposed in the space created between each pair of fingers 62 of the second wheel cover 18 (also shown in FIG. 9), and a respective one of each of the second leg members 44B of the first wheel cover 16 is disposed above or outwardly with respect to a respective one of each of the fingers 62 of the second wheel cover 18 (also shown in FIG. 10).

Next, preferably the first wheel cover 16 is rotated or "clocked" in either a clockwise or counterclockwise direction relative to the second wheel cover 18 such that a respective one of the first leg members 44A of the first wheel cover 16 is moved into an associated corresponding recess 66 of the second wheel cover 18, as shown in FIGS. 11 and 13, and a respective one of the second leg members 44B is disposed in the space created between each pair of fingers 62 of the second wheel cover 18 (as shown in FIG. 12). The first leg members 44A are preferably received within the recesses 66 in an interference fit therewith. Also, preferably a suitable adhesive (partially shown in FIG. 11 at 70), may be used to further aid in securing the first wheel cover 16 to the second wheel cover 18. The adhesive 70 could be applied to either the first leg member 44A, the recess 66 or both prior to the above "clocking" step.

Following the securing of the first wheel cover 16 and the second wheel cover 18 together in step 90, in the next step 92 in the illustrated embodiment of the assembly process the assembled wheel covers 16 and 18 are secured to the insert 14. Preferably to accomplish this, adhesive is used in order to permanently secure the prior assembled wheel cover 16 and 18 of step 90 to the insert 16 during step 92. As shown in FIG. 1, the adhesive is preferably selectively applied in an adhesive pattern P1, an adhesive pattern P2 and an adhesive pattern P3 on the outboard face 50 of the insert 14. In the illustrated embodiment, the adhesive pattern P1 is shown as being a non-continuous or interrupted (or alternatively continuous (not shown)), circular pattern disposed just outwardly relative to the central opening 14A of the insert 14. The adhesive pattern P2 is shown as being generally Z-shaped and disposed on each of spokes 14B of the insert 14. The adhesive pattern P3 on the insert 14 is shown as being a non-continuous (or alternatively continuous (not shown)), circular pattern disposed on the outer annular portion 14D thereof.

After the adhesive has been applied in the patterns P1, P2, and P3, the prior assembled wheel cover 16 and 18 are moved adjacent the insert 14 to a predetermined position whereby the adhesive applied in the patterns P1, P2 and P3 are effective to permanently secure the wheel cover 16 and 18 to the insert 14 following the assembly thereof in step 92. Alternatively, one or more of the patterns P1, P2 and P3 of the adhesive may be other than illustrated and described if so desired so long as the adhesive is effective to permanently secure the prior assembled wheel cover 16 and 18, to the insert 14 during step 92.

Preferably, the adhesive selected for patterns P1, P2 and P3 are non-expanding types of adhesives and may include but are not limited to the use of one or a combination of more than one of adhesives selected from the group consisting of one or two part silicone adhesives, two-part epoxy adhesives, one or two part urethane adhesives, double-sided tape, and the like. Alternatively, one or more of the types of adhesive used for the patterns P1, P2 and P3 may be other than illustrated and described if so desired. Alternatively, an adhesive may be selectively deposited on the inboard surface 16A of the cover 16 and/or on the inboard surface 18A of the cover 18 in a selective pattern or in any other suitable patterns thereon in order to permanently secure the wheel covers 16 and 18 to the insert 14 (and/or to the wheel 12).

Preferably, as shown in FIG. 14, the selected pre-assembly adhesive patterns P1, P2 and P3 result in a post-assembly adhesive pattern wherein areas between opposed surfaces of the associated components of the multi-piece vehicle wheel cover retention system 10 do not include any adhesive therebetween, i.e., a non-full surface post assembly adhesive pattern which has one or more voids or gaps 24 therein. However, depending upon the particular wheel assembly configuration and/or the type of adhesive which is used, the post assembly adhesive pattern result in a full surface adhesive pattern, such as if double-sided adhesive tape was used or if a foaming type of adhesive is used. Regardless of this, it is preferred that the post assembly adhesive pattern does not squeeze out or ooze out from between any of the associated areas (e.g., openings, holes, and/or edges), defined between the wheel 12, the insert 14 and the wheel cover 16 and 18, which would then require such adhesive to be subsequently cleaned or removed therefrom following the assembly thereof.

Following this, in the illustrated of the assembly process the assembled wheel covers 16 and 18 and insert 14 are secured to the wheel 12 in step 94. Preferably to accomplish this, adhesive is used in order to permanently secure the prior assembled wheel covers 16 and 18 and insert 16 to the wheel 12. As shown in FIG. 1, the adhesive is preferably selectively applied in a pre-assembly adhesive pattern P4, an adhesive pattern P5, and an adhesive pattern P6 on the outboard face 20A of the wheel 12.

In the illustrated embodiment, the adhesive pattern P4 on the outboard face 20A of the wheel 12 is shown as being a non-continuous or interrupted (or alternatively continuous (not shown)), circular pattern disposed near the outboard tire bead seat retaining flange 26A. The adhesive pattern P5 is shown as being generally Z-shaped and disposed on each of the spokes 20C of the wheel 12. The adhesive pattern P6 is shown as being an interrupted or non-continuous (or alternatively continuous (not shown)), circular pattern disposed just outwardly relative to the lug bolt receiving holes 24B.

Preferably, the adhesive selected for patterns P4, P5 and P6 are non-expanding types of adhesives and may include but are not limited to the use of one or a combination of more than one of adhesives selected from the group consisting of one or two part silicone adhesives, two-part epoxy adhesives, one or two part urethane adhesives, double-sided tape, and the like.

Alternatively, an adhesive may be selectively deposited on the inboard face 52 of the insert 14 in a selective pattern or may be selectively deposited on both the outboard face 20A of the wheel 12, the inboard face 52 of the insert 14, and/or the inboard surface 18A of the second wheel cover 18 in order to permanently secure the prior assembled wheel covers 16 and 18 and insert 14 to the wheel 12. Alternatively, one or more of the adhesive patterns P4, P5 and P6 of the adhesive and/or the type of the adhesive which is used may be other than illustrated and described if so desired.

After the adhesive has been applied in the adhesive patterns P4, P5 and P6, the prior assembled wheel covers 16 and 18 and insert 14 are moved adjacent the outboard face 20A of the wheel 12 to a predetermined position whereby the adhesive applied in the patterns P4, P5 and P6 are effective to permanently secure the prior assembled wheel covers 16 and 18 and insert 14 to the wheel 12. As shown in FIG. 14, in the illustrated embodiment, in the assembled wheel the adhesive pattern P4 is disposed between portions of the outboard face 20A of the wheel 12 and the inboard surface 16A of the first wheel cover 16. The adhesive pattern P5 is disposed between portions of the outboard face 20A of the wheel 12 and an inboard surface 14E of the insert 14. The adhesive pattern P1 is disposed between portions of an outboard surface 14F of the insert 14 and the inboard surface 18A of the second wheel cover 18. Alternatively, one or more of the patterns P4, P5 and P6 of the adhesive may be other than illustrated and described and disposed between other portions of the multi-piece vehicle wheel cover retention system 10 other than those illustrated and described if so desired so long as the adhesive is effective to permanently secure the prior assembled wheel cover 16 and 18 and insert 14 to the wheel 12. For example, adhesive may be between portions of the outboard face 20A of the wheel 12 and the inboard surface 18A of the second wheel cover 18 if so desired.

Figure 19:
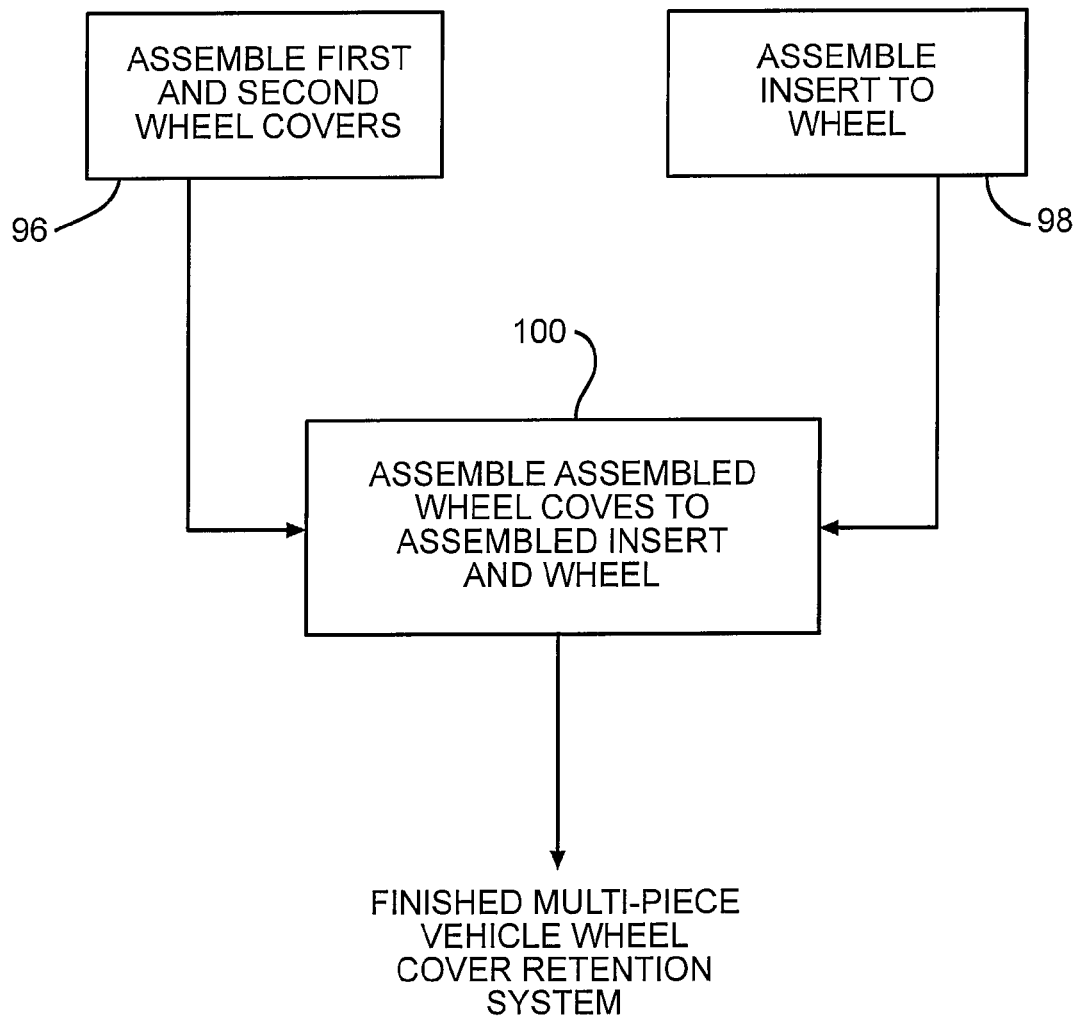
FIG. 19 is a flow chart illustrating a second embodiment of a sequence of steps for producing an embodiment of the multi-piece vehicle wheel cover retention system of the present invention.

Preferably, the selected pre-assembly adhesive patterns P4, P5 and P6 result in a post-assembly adhesive pattern wherein areas between the outboard face 20A of the wheel 12 and the inboard face 14E of the insert 14 and the inboard surfaces 16A and 18A of the wheel covers 16 and 18, respectively, do not include any adhesive therebetween, i.e., a non-full surface post assembly adhesive pattern. However, depending upon the particular wheel assembly configuration and/or the adhesive which is used, the post assembly adhesive pattern could be full surface, such as if double-sided adhesive tape was used or if a foaming type of adhesive is used. Regardless of this, it is preferred that the post assembly adhesive pattern does not squeeze out or ooze out from between any of the associated areas (e.g., openings, holes, and/or edges), defined between the wheel 12, the insert 14 and the wheel cover 16 and 18, which would then require such adhesive to be subsequently cleaned or removed therefrom following the assembly thereof. Alternatively, the assembly process for producing the multi-piece vehicle wheel cover retention system 10 may be other than illustrated and described if so desired. For example, as shown in FIG. 19, the insert 14 may be first secured to the wheel 12 in step 98 and then the prior assembled wheel covers 16 and 18 of step 96 may then be secured to this prior assembled wheel 12 and insert 14 assembly in step 100 to produce the multi-piece vehicle wheel cover retention system 10.

Also, in order to assist in retaining the associated parts of the multi-piece vehicle wheel cover retention system 10 together until the adhesive cures, temporary and/or permanent fixing surface features, members or systems, such as snap tabs, projections, and fasteners, may be used if so desired. For example, the wheel cover 18 may be provided with one or more "short" tabs or legs 72 (as shown in FIGS. 5, 8 and 11), and/or with one or more "long" tabs or legs 72A (as shown in FIG. 5), being shown disposed for example, on one or mores sides 54A of the associated wheel cover windows 54 thereof. The tabs 72 and/or 72A are operative to retain the assembled wheel covers 16 and 18 by a snap fit engagement to the insert 14, and therefore to the wheel 12, while the associated adhesive therebetween cures to permanently secure the component parts together and produce the multi-piece vehicle wheel cover retention system 10.

A further example is that the wheel cover 18 may include axially extending "long" legs or posts 74, such as shown in FIG. 5, formed thereon which may extend through aligned openings 14G and 20B, such as shown in FIG. 1, formed in the insert 14 and wheel disc 20, respectively, to assist in retaining the associated parts of the multi-piece vehicle wheel cover retention system 10 together until the adhesive cures. Thus, it can be seen that suitable surface features or members, such as the illustrated tabs 72 and/or 72A and posts 74, may be provided on an associated component of the multi-piece vehicle wheel cover retention system 10, such as the wheel cover 18, to assist in retaining the associated parts together until the adhesive cures.

Further, as shown in FIG. 14, in the illustrated embodiment the outer end 40 of the first wheel cover 16 is preferably disposed in a circumferential, radially outwardly facing groove 76 formed in an inner surface of the outboard tire bead seat retaining flange 26A so that the first wheel cover 16 does not interfere with the attachment of a wheel balance weight 74 (shown in phantom). Alternatively, the outer end 40 of the first wheel cover 16 may be other than illustrated and described if so desired. For example, the outer end 40 may not extend all the way around so as to cover the entire portion of a remote end 26A' of the outboard tire bead seat retaining flange 26A if so desired.

Figure 15:
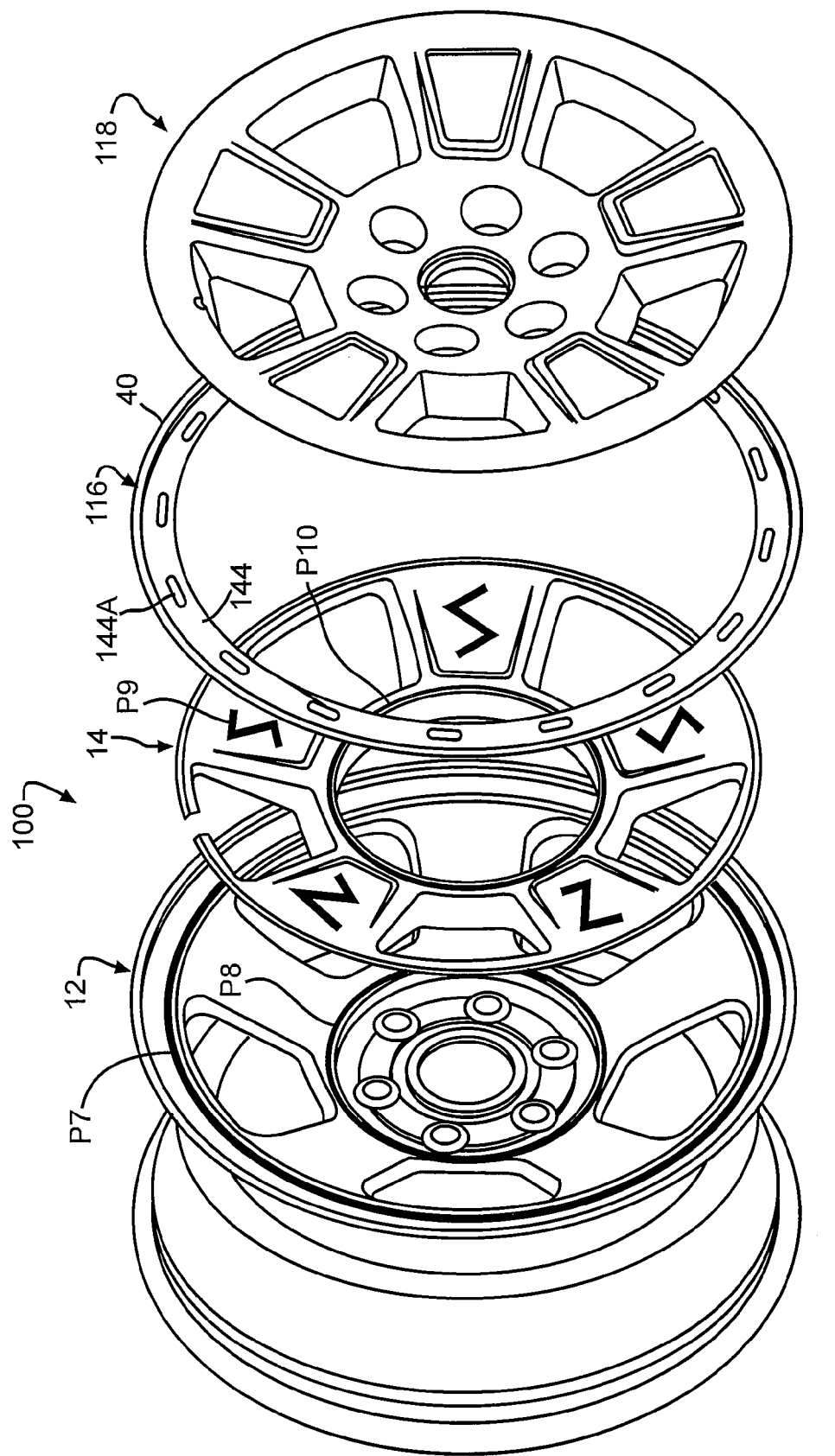
FIG. 15 is an exploded perspective view of a second embodiment of a multi-piece vehicle wheel cover retention system.

Referring now to FIG. 15 and using like reference numbers to indicate corresponding parts, there is illustrated an exploded perspective view of a second embodiment of a multi-piece vehicle wheel cover retention system, indicated generally at 100, according to the present invention. In this embodiment, a first wheel cover 116 and a second wheel cover 118 are provided and which use a different method of securement compared to the first wheel cover 16 and the second wheel cover 18 described above in connection with the first embodiment of the multi-piece vehicle wheel cover retention system 10. Thus, only those portions of the second embodiment of the multi-piece vehicle wheel cover retention system 100 which differ from the first embodiment of the multi-piece vehicle wheel cover retention system 10 will be discussed in detail below. In addition, in this embodiment, an insert (shown in phantom at 114) is optionally provided and may or may not be necessary depending upon the particular wheel configuration.

Figure 16:
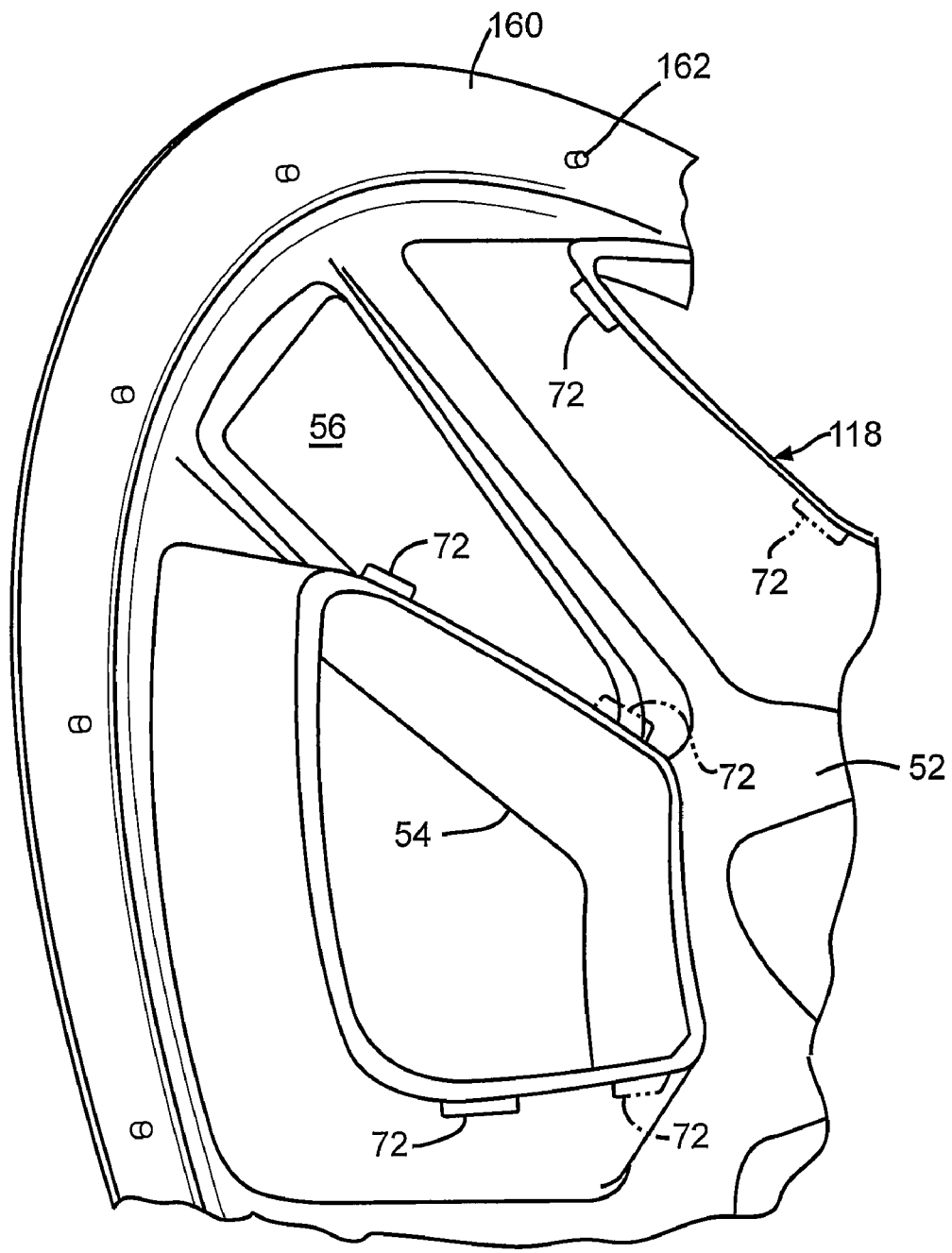
FIG. 16 is a plan view of a portion of the multi-piece vehicle wheel cover retention system illustrated in FIG. 15, showing a portion of the associated vehicle wheel cover, prior to assembly thereof.
Figure 17:
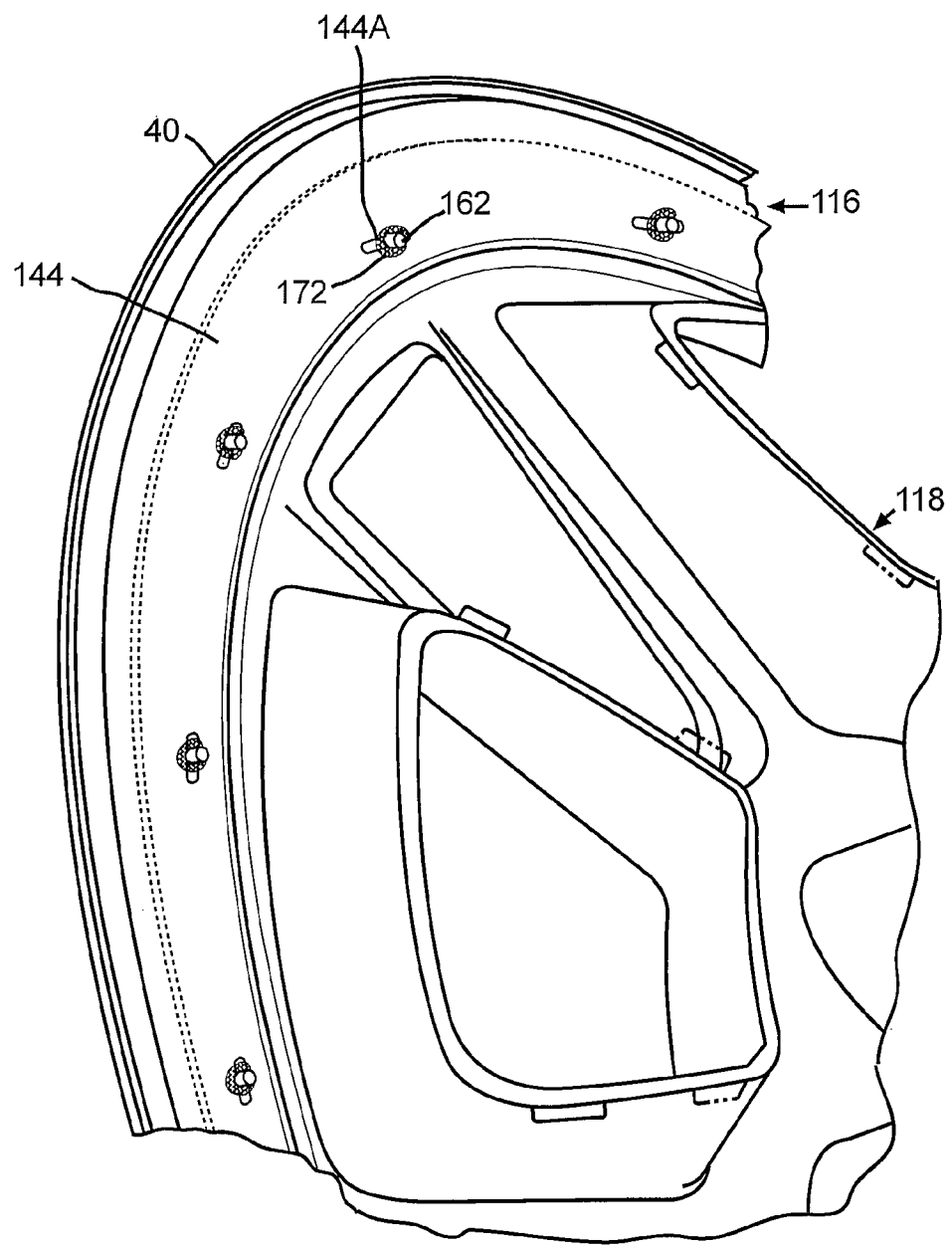
FIG. 17 is a plan view of a portion of the multi-piece vehicle wheel cover retention system illustrated in FIG. 15, showing a portion of the associated vehicle wheel cover following assembly thereof.

As shown in FIG. 15, in this embodiment the first wheel cover 116 is provided with a plurality of openings or slots 144A provided in a second leg 144 thereof. As shown in FIG. 16, in this embodiment the second wheel cover 118 is provided with a surface feature comprising a plurality of upstanding tabs or protuberances 162 extending from a generally flat continuous surface 160 thereof. As a result of this, as shown in FIG. 17, the first wheel cover 116 is secured to the second wheel cover 118 by passing the tabs 162 through the openings 144A preferably in an interference fit therewith. An adhesive (shown at 172 in FIG. 17, may be used to further aid in securing the first wheel cover 116 to the second wheel cover 118. The adhesive could be applied to either the tabs 166, the openings 144A or both prior to the above assembling step. Alternatively, the shape, number or configuration of the openings 144A and/or the tabs 162 may be other than illustrated if so desired.

As shown in this embodiment, adhesive is applied in preassembly patterns P7 and P8 on the outboard face of the wheel 12 and adhesive is applied in preassembly patterns P9 and P10 on the outer surface 14F of the insert 14. As can be understood, using these adhesive patterns P7, P8, P9 and P10 (or other suitable adhesive patterns), the assembly process for permanently securing together the associated parts of the multi-piece vehicle wheel cover retention system 100 will generally follow the assembly process(es) described and illustrated above in connection with the multi-piece vehicle wheel cover retention system 10. Alternatively, the assembly process for this embodiment of the multi-piece vehicle wheel cover retention system 100 may be other than illustrated and described if so desired. In accordance with this invention, the particular adhesive patterns are selected so as to use only that amount of adhesive which is needed to reliably and permanently secure the insert 14 and wheel covers 16 and 18 to the wheel 12 and which preferably does not allow any hollow sound therebetween if the wheel cover 16 and/or 18 is tapped or struck.

Figure 20:
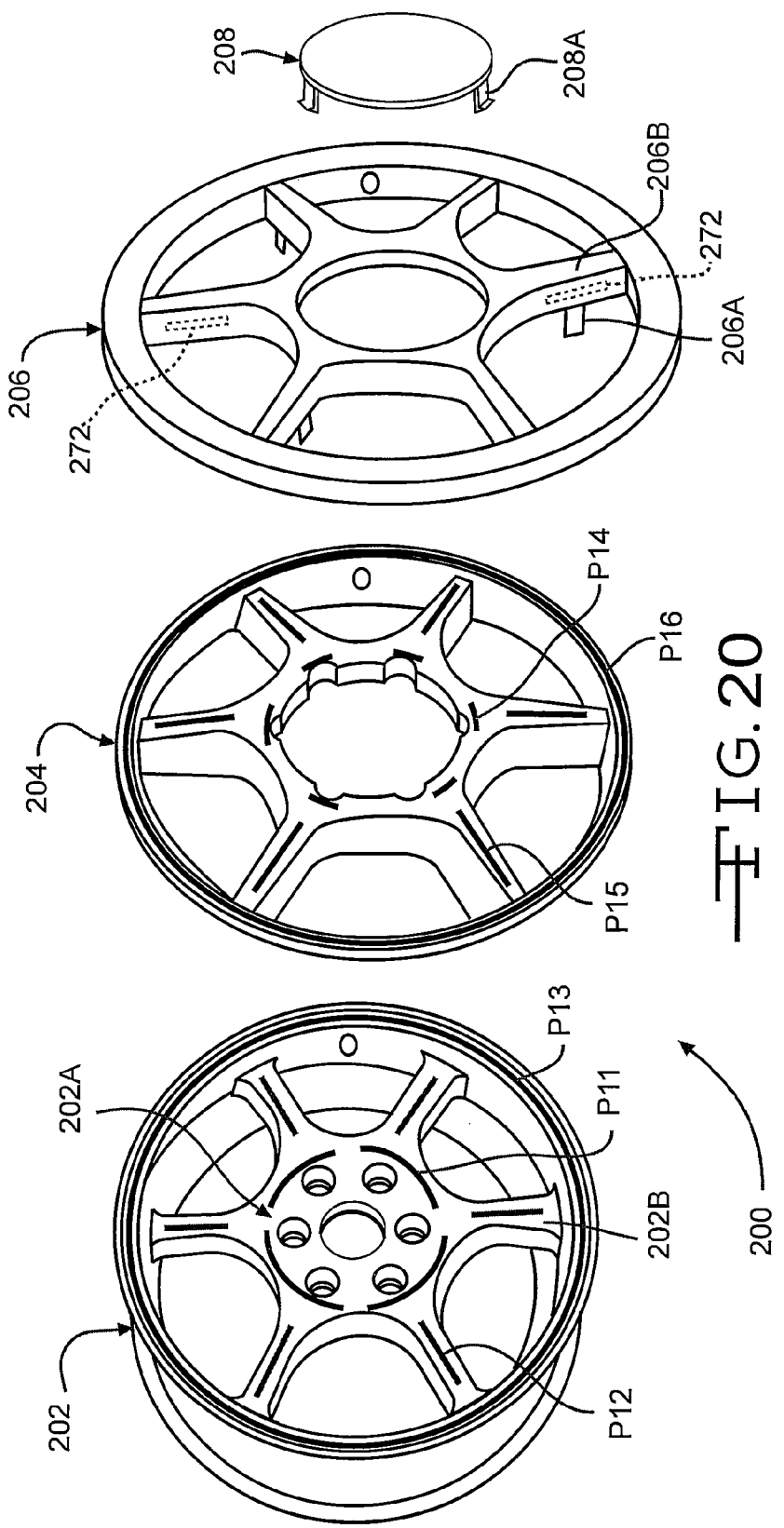
FIG. 20 is an exploded perspective view of a third embodiment of a multi-piece vehicle wheel cover retention system.

Referring now to FIG. 20 and using like reference numbers to indicate corresponding parts, there is illustrated an exploded perspective view of a third embodiment of a multi-piece vehicle wheel cover retention system, indicated generally at 200, according to the present invention. In this embodiment, the vehicle wheel cover retention system 200 includes a wheel 202, an insert 204, a wheel cover 206 and a center cap 208. The insert 204 is secured to the wheel 202 by adhesive which can be applied in preassembly patterns P11, P12 and P13 on an outboard face of the wheel 12. The wheel cover 206 is secured to the insert 204 by adhesive which can be applied in preassembly patterns P14, P15 and P16 on an outboard face of the insert 204. As can be understood, using these adhesive patterns P11-P16 (or other suitable adhesive patterns), the assembly process for permanently securing together the associated parts of the multi-piece vehicle wheel cover retention system 200 will generally follow the assembly process(es) described and illustrated above in connection with the multi-piece vehicle wheel cover retention systems 10 and 100.

For example, as shown in FIG. 21, the assembly process may first secure the insert 204 to the wheel 202 in step 210 and then the cover 206 to the insert 204 and wheel 202 in step 212. Alternatively, the assembly process may first secure the cover 206 to the insert 204 and then the cover 206 and insert 204 to the wheel 202.

In the illustrated embodiment, the center cap 208 may releasably secured to the cover 206 or the wheel 202 via tabs 208A. Alternatively, the cover 206 may be similar to the cover 18 discussed above wherein the cover 206 would extend inwardly toward the wheel center so as to cover an associated inner wheel mounting portion 202A of the wheel 202 so that the center cap 208 is not needed.

Also, mechanical fasteners or the like may be provided to assist in retaining the insert 204 and cover 206 to the wheel 202 while the adhesive cures. For example, in the case of a plastic wheel cover 206, the cover 206 may include a "snap-in" post (not shown), which can be similar to the post 74 shown in the embodiment illustrated in FIG. 4 or can include one or more tabs 272 (two of such tabs 272 shown in FIG. 20), which may be similar to the tabs 72A shown above in the embodiment illustrated in FIG. 5. In the case of a stainless steel cover 206, the cover 206 may include one or more tabs 206A, such as shown in FIG. 20, provided on the back side of the cover 206, such as adjacent one or more of a plurality of spokes 206B thereof.

Following assembly, the tabs 206A are adapted to be bent over into contact with a spoke 202B of the wheel 202 to secure the cover 206, and therefore the insert 204, to the wheel 202 while the adhesive cures. In addition to the tabs 206A or in place thereof, the cover 206 may have temporary and/or permanent fixing surface features, members or systems, such as snap tabs, projections, and fasteners, such as the tabs 72 and/or 72A and/or the post 74 discussed above, which are operative to retain the wheel cover 206 to the insert 204, and therefore to the wheel 202, while the associated adhesive therebetween cures to permanently secure the component parts together and produce the multi-piece vehicle wheel cover retention system 200.

Alternatively, the assembly process for this embodiment of the multi-piece vehicle wheel cover retention system 200 may be other than illustrated and described if so desired. In accordance with this invention, the particular adhesive patterns are selected so as to use only that amount of adhesive which is needed to reliably and permanently secure the insert 204 and wheel cover 206 to the wheel 202 and which preferably does not allow any hollow sound therebetween if the wheel cover 206 is tapped or struck.

One advantage of the present invention is that multi-piece vehicle wheel cover retention system 10, 100 and 200 covers substantially the entire visible area of the outboard face of the associated vehicle wheel. As a result, the multi-piece vehicle wheel cover retention system 10, 100 and 200 completely disguises the configuration of the associated underlying base structural vehicle wheel.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A method for producing a multi-piece vehicle wheel cover retention system comprising the steps of:
   (a) providing a wheel having a wheel disc defining an axis and an outboard facing wheel surface and including an outboard tire bead seat retaining flange;
   (b) providing a first outer wheel cover formed from a metal material, the first outer wheel cover covering at least a portion of outboard tire bead seat retaining flange of the wheel disc;
   (c) providing a second inner wheel cover formed from a plastic material, the second inner wheel cover covering at least a substantial portion of the outboard facing wheel surface of the wheel disc, the second wheel cover including an outboard surface and an inboard surface;
   (d) providing an insert formed from a foam material and which generally corresponds to at least the shape of a space which is formed between the outboard facing wheel surface of the wheel and the inboard surface of the second wheel cover, the insert including an outboard surface and an inboard surface;
   (e) securing the first outer wheel cover and the second inner wheel cover together by at least an interference fit therewith; and
   (f) permanently securing the assembled wheel covers of step (e), the insert and the wheel to one another by adhesive to produce the multi-piece vehicle wheel retention system.

2. The method of claim 1 wherein step (f) includes the steps of (f1) first permanently securing the insert to the wheel covers secured together in step (e) by adhesive followed by the step of (f2) permanently securing the assembled insert and wheel covers to the wheel disc by adhesive to thereby produce the multi-piece vehicle wheel retention system.

3. The method of claim 2 wherein the adhesive in step (f1) is selectively applied in a first preassembly adhesive pattern having at least an adhesive pattern applied radially outwardly and adjacent a central opening of the insert and in a second preassembly adhesive pattern applied on at least one of a plurality of spokes of the insert.

4. The method of claim 3 wherein the adhesive in step (f1) is further selectively applied in a third preassembly adhesive pattern having an adhesive pattern applied on an outer annular portion of the insert.

5. The method of claim 2 wherein the adhesive in step (f2) is selectively applied in a fourth preassembly adhesive pattern having at least an adhesive pattern radially outwardly and adjacent a plurality of lug bolt receiving holes formed in the wheel disc and in a fifth preassembly adhesive pattern adjacent an outboard tire bead seat retaining flange of the wheel.

6. The method of claim 5 wherein the adhesive in step (f2) is further selectively applied in a sixth preassembly adhesive pattern having an adhesive pattern applied on at least one of a plurality of spokes of the wheel.

7. The method of claim 1 wherein the first outer wheel cover of step (b) includes a generally U-shaped outer end, a first leg which extends generally parallel with respect to the axis, and a second leg which extends generally perpendicular to the first leg, and wherein in step (e) at least a portion of the second leg of the first outer wheel cover extends behind the second inner wheel cover so as to be adjacent the inboard surface of the second inner wheel cover and wherein the at least a portion of the second leg of the first outer wheel cover is at least secured to the second wheel cover by the at least a portion of the second leg being disposed within a surface feature provided only on the inboard surface of the second inner wheel cover to thereby secure the first outer wheel cover and the second inner wheel cover together in the interference fit therewith.

8. The method of claim 7 wherein step (e) includes applying an adhesive on at least one of the inboard surface of the second inner wheel cover and an outboard surface of the first wheel cover in the area of the surface feature to permanently secure the first outer wheel cover to the second inner wheel cover.

9. The method of claim 2 wherein the second inner wheel cover is provided with at least one surface feature formed thereon which is adapted to retain the assembled wheel covers to at least one of the insert and the wheel by a snap fit engagement therewith until the adhesive therebetween cures.

10. A multi-piece vehicle wheel cover retention system comprising:

a wheel having a wheel disc defining an axis and an outboard facing wheel surface and including an outboard tire bead seat retaining flange;

a first outer wheel cover formed from a metal material, the first outer wheel cover covering only the entire portion of the outboard tire bead seat retaining flange of the wheel disc;

a second inner wheel cover formed from a plastic material, the second inner wheel cover covering at least a substantial portion of the outboard facing wheel surface of the wheel disc, the second wheel cover including an outboard surface and an inboard surface, the first outer wheel cover and the second inner wheel cover together by at least an interference fit therewith; and an insert formed from a foam material and which generally corresponds to at least the shape of a space which is formed between the outboard facing wheel surface of the wheel and the inboard surface of the second wheel cover, the insert including an outboard surface and an inboard surface;

wherein the first outer wheel cover, the second inner wheel cover, the insert and the wheel are permanently secured to one another by adhesive to produce the multi-piece vehicle wheel retention system.

11. The multi-piece vehicle wheel cover retention system of claim 10 wherein the first outer wheel cover includes a generally U-shaped outer end, a first leg which extends generally parallel with respect to the axis, and a second leg which extends generally perpendicular to the first leg, and wherein at least a portion of the second leg of the first outer wheel cover extends behind the second inner wheel cover so as to be adjacent the inboard surface of the second inner wheel cover and wherein the at least a portion of the second leg of the first outer wheel cover is at least secured to the second wheel cover by the at least a portion of the second leg being disposed within a surface feature provided only on the inboard surface of the second inner wheel cover to thereby secure the first outer wheel cover and the second inner wheel cover together in the interference fit therewith.

12. The multi-piece vehicle wheel cover retention system of claim 11 wherein adhesive is applied on at least one of the inboard surface of the second inner wheel cover and an outboard surface of the first wheel cover in the area of the surface feature to permanently secure the first outer wheel cover to the second inner wheel cover.

13. The multi-piece vehicle wheel cover retention system of claim 10 wherein the second inner wheel cover is provided with at least one surface feature formed thereon which is adapted to retain the assembled wheel covers to at least one of the insert and the wheel by a snap fit engagement therewith until the adhesive therebetween cures.

14. The multi-piece vehicle wheel cover retention system of claim 10 wherein the adhesive is selectively applied in a first preassembly adhesive pattern having at least an adhesive pattern applied radially outwardly and adjacent a central opening of the insert and in a second preassembly adhesive pattern applied on at least one of a plurality of spokes of the insert.

* * * * *